(12) United States Patent
Park et al.

(10) Patent No.: US 10,749,726 B2
(45) Date of Patent: Aug. 18, 2020

(54) REFERENCE SIGNAL FOR PI/2 BINARY PHASE SHIFT KEYING (BPSK) MODULATION

(71) Applicant: QUALCOMM Incorporated, San Diego, CA (US)

(72) Inventors: Seyong Park, San Diego, CA (US); Yi Huang, San Diego, CA (US); Peter Gaal, San Diego, CA (US); Renqiu Wang, San Diego, CA (US); Xiao Feng Wang, San Diego, CA (US); Sony Akkarakaran, Poway, CA (US); Timo Ville Vintola, San Diego, CA (US); Tao Luo, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/193,939

(22) Filed: Nov. 16, 2018

(65) Prior Publication Data

US 2019/0158339 A1 May 23, 2019

Related U.S. Application Data

(60) Provisional application No. 62/588,298, filed on Nov. 17, 2017.

(51) Int. Cl.
*H04L 27/34* (2006.01)
*H04L 27/26* (2006.01)
(Continued)

(52) U.S. Cl.
CPC ...... *H04L 27/3411* (2013.01); *H04J 13/0022* (2013.01); *H04J 13/0029* (2013.01);
(Continued)

(58) Field of Classification Search
CPC ............... H04L 27/3411; H04L 27/206; H04L 27/2613; H04L 27/2636; H04L 27/3444; H04J 13/0022; H04J 13/0029
(Continued)

(56) References Cited

U.S. PATENT DOCUMENTS

| 2009/0175228 | A1* | 7/2009 | Kimura | ................. H04L 5/0007 370/329 |
| 2010/0246527 | A1* | 9/2010 | Montojo | ............. H04L 25/0226 370/330 |
| 2019/0036746 | A1* | 1/2019 | Hwang | ............... H04L 27/2613 |

OTHER PUBLICATIONS

Huawei et al., "Design of UL DMRS Sequence for Data Transmission", 3GPP Draft, R1-1720635, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051369254, 11 Pages, Retrieved from the Internet: URL:http://www.3gpp.org/ftp/tsg%5Fran/WG1%5FRL1/TSGR1%5F91/Docs/ [retrieved on Nov. 17, 2017], Section 3.
(Continued)

*Primary Examiner* — Michael R Neff
(74) *Attorney, Agent, or Firm* — Loza & Loza LLP

(57) ABSTRACT

Various aspects directed towards generating a reference signal for pi/2-binary phase shift keying (BPSK) modulation are disclosed. In an example, a pi/2-BPSK sequence is selected from a plurality of candidate sequences. A reference signal is then generated based on the selected pi/2-BPSK sequence such that the reference signal is associated with a transmission of data modulated according to a π/2-BPSK modulation.

28 Claims, 15 Drawing Sheets

(51) Int. Cl.
 *H04J 13/00* (2011.01)
 *H04L 27/20* (2006.01)
(52) U.S. Cl.
 CPC ........ *H04L 27/206* (2013.01); *H04L 27/2613* (2013.01); *H04L 27/2636* (2013.01); *H04L 27/3444* (2013.01)
(58) Field of Classification Search
 USPC .......................................................... 375/296
 See application file for complete search history.

(56) References Cited

OTHER PUBLICATIONS

Ilth, et al., "Pre-DFT Multiplexing of RS and Data: Results on Short Duration One OFDM Symbol Uplink", 3GPP Draft; R1-1701913, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), 7 Pages, XP051209075, Retrieved from the Internet: URL: http://www.3gpp.org/ftp/Meetings_3GPP_SYNC/RAN1/Docs/ (retrieved on Feb. 12, 2017).

International Search Report and Written Opinion—PCT/US2018/061700—ISA/EPO dated Apr. 5, 2019.

MCC Support: "Final Report of 3GPP TSG RAN WG1 #AH_NR3 v1.0.0",3GPP Draft, Final_Minutes_Report_RAN1#AH_NR3_V100, 3rd Generation Partnership Project (3GPP), Mobile Competence Centre, 650, Route Des Lucioles, F-06921 Sophia-Antipolis Cedex, France vol. RAN WG1, No. Prague, Czech Rep, Oct. 9, 2017-Oct. 13, 2017, Oct. 8, 2017 (Oct. 8, 2017), XP051354030, pp. 1-104, Retrieved from the Internet: URL:http://www.3gpp.org/ftp/tsg_ran/WG1_RL1/TSGR1_AH/NR_AH_1709/Report/ [retrieved on Oct. 8, 2017].

Qualcomm Incorporated: "Low PAPR Modulation", 3GPP Draft; R1-1714186 Low PAPR Modulation, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017 (Aug. 20, 2017), XP051316975, Retrieved from the Internet: URL:http://www.3gpp.org/ftp/Meetings_3GPP_SYNC/RAN1/Docs/ [retrieved on Aug. 20, 2017], 4 pages.

Qualcomm Incorporated: "Low PAPR Modulation", 3GPP Draft; R1-1718594, Low PAPR Modulation, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 3, 2017, XP051353156, Retrieved from the Internet: URL:http://www.3gpp.org/ftp/tsg_ran/WG1_RL1/TSGR1_90b/Docs/ [retrieved on Oct. 3, 2017], 9 pages, Section 3.

Qualcomm Incorporated: "Remaining Issues on DMRS Design", 3GPP Draft, R1-1718547, 3rd Generation Partnership Project (3GPP), Mobile Competence Centre, 650, Route Des Lucioles, F-06921 Sophia-Antipolis Cedex, France, vol. RAN WG1, No. Prague, CZ; Oct. 9, 2017-Oct. 13, 2017, Oct. 3, 2017 (Oct. 3, 2017), XP051353115, pp. 1-14, Retrieved from the Internet:URL:http://www.3gpp.org/ftp/tsg_ran/WG1_RL1/TSGR1_90b/Docs/ [retrieved on Oct. 3, 2017], Sections 9 and 10.

Qualcomm Incorporated: "Remaining Issues on DMRS Design", 3GPP Draft, R1-1721432, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Dec. 5, 2017 (Dec. 5, 2017), XP051370808, pp. 1-29, Retrieved from the Internet: URL:http://www.3gpp.org/ftp/tsg%5Fran/WG1%5FRL1/TSGR1%5F91/Docs/ [retrieved on Dec. 5, 2017], Section 7.3.

* cited by examiner

REFERENCE SIGNAL FOR PI/2 BINARY PHASE SHIFT KEYING (BPSK) MODULATION

CROSS-REFERENCE TO RELATED APPLICATIONS

The application claims priority to and the benefit of U.S. provisional patent application No. 62/588,298 filed on Nov. 17, 2017, the entire content of which is incorporated herein by reference as if fully set forth below in its entirety and for all applicable purposes.

TECHNICAL FIELD

The technology discussed below relates generally to wireless communication systems, and more particularly, to generating a reference signal for pi/2-binary phase shift keying (BPSK) modulation.

INTRODUCTION

In wireless communication systems, many different multiplexing and multiple access algorithms are known. Among these algorithms, orthogonal frequency division multiplexing (OFDM) has gained widespread adoption due to advantages such as a high spectral efficiency and low susceptibility to multipath fading. However, OFDM waveforms generally suffer from a high peak-to-average power ratio (PAPR) relative to other multiplexing and multiple access algorithms. When transmitting signals, minimizing the PAPR is generally desired in order to maximize the efficiency of transmitting devices, such as a user equipment (UE).

Several techniques are known to reduce the PAPR relative to OFDM waveforms. For example, discrete Fourier transform-spread-OFDM (DFT-s-OFDM) waveforms exhibit a lower PAPR than OFDM waveforms, and for this reason, are often utilized for uplink transmissions in wireless communication systems. In addition, different waveform modulation techniques can affect the PAPR. Still further, particularly for transmissions of pilots and reference signals, the use of certain sequences such as constant amplitude zero autocorrelation (CAZAC) sequences (e.g., Zadoff-Chu sequences) and quadrature phase-shift keying pseudo-noise QPSK PN spreading sequences, can reduce the PAPR of the transmission. Still, there remains a desire in the art to minimize the PAPR while retaining the benefits of an OFDM transmission.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards generating a reference signal for pi/2-binary phase shift keying (BPSK) modulation are disclosed. In a particular example, a method is disclosed which includes selecting a pi/2-BPSK sequence from a plurality of candidate sequences. The method further includes generating a reference signal based on the selected pi/2-BPSK sequence such that the reference signal is associated with a transmission of data modulated according to a π/2-BPSK modulation.

In another aspect, an apparatus for wireless communication is disclosed. The apparatus includes a processor communicatively coupled to each of a selecting circuitry and a generating circuitry. For this example, the selecting circuitry can be configured to select a pi/2-BPSK sequence from a plurality of candidate sequences, whereas the generating circuitry can be configured to generate a reference signal based on the selected pi/2-BPSK sequence such that the reference signal is associated with a transmission of data modulated according to a pi/2-BPSK modulation.

In a further aspect, another apparatus for wireless communication is disclosed, which includes means for selecting a sequence and means for generating a reference signal. For this example, the means for selecting can be configured to select a pi/2-BPSK sequence from a plurality of candidate sequences, whereas the means for generating can be configured to generate a reference signal based on the selected pi/2-BPSK sequence such that the reference signal is associated with a transmission of data modulated according to a pi/2-BPSK modulation.

In yet another aspect, a non-transitory computer-readable medium is disclosed, which stores computer-executable code that includes code for causing a computer to perform various acts. For this example, such code may include code for causing the computer to select a pi/2-BPSK sequence from a plurality of candidate sequences. The code may further include code for causing the computer to generate a reference signal based on the selected pi/2-BPSK sequence such that the reference signal is associated with a transmission of data modulated according to a pi/2-BPSK modulation.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 illustrates a second and third set of exemplary binary sequences in accordance with an aspect of the disclosure.

DETAILED DESCRIPTION

Figure 1:
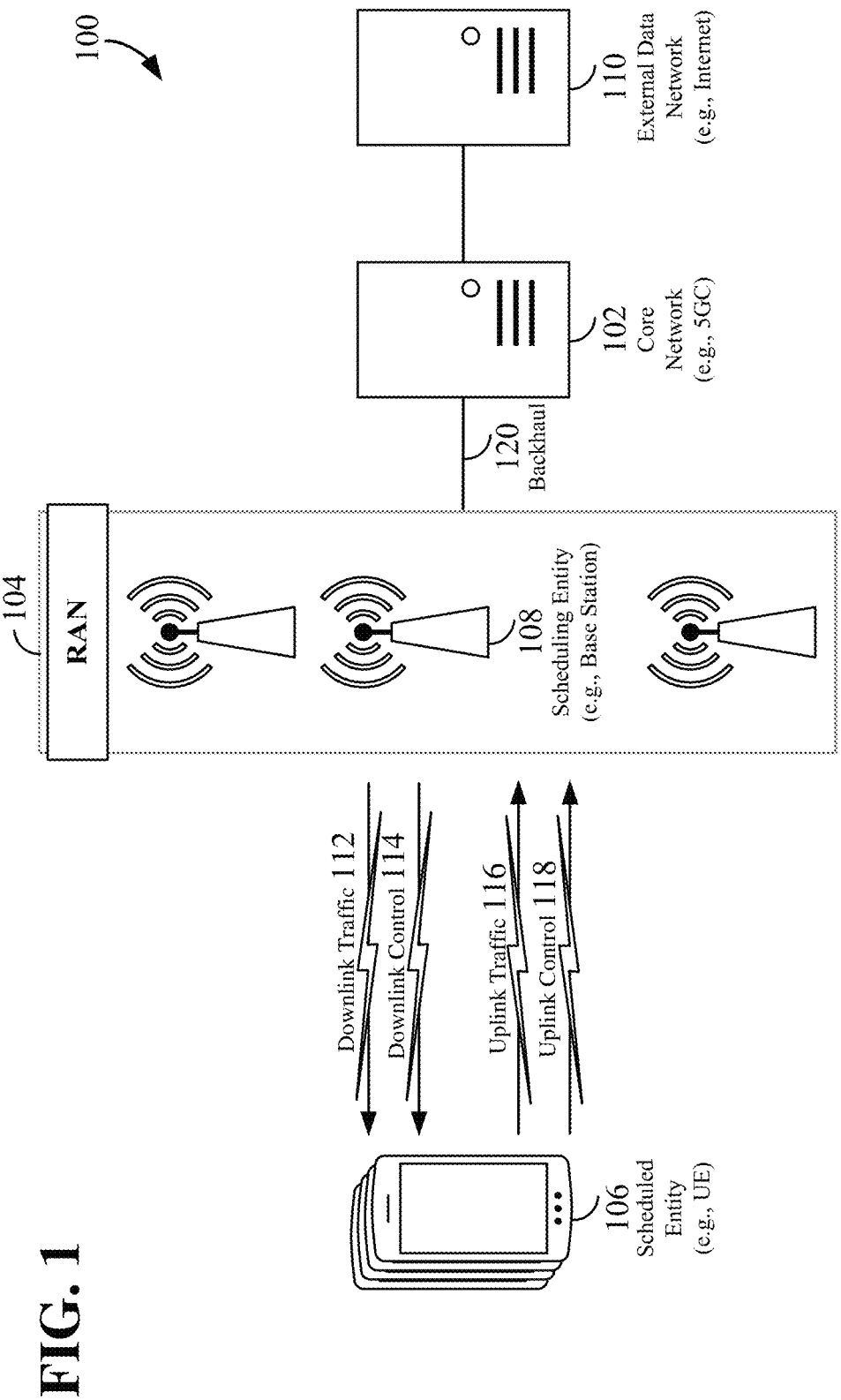
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

IoT: the Internet of things. In general, this refers to the convergence of numerous technologies with diverse use cases into a single, common infrastructure. Most discussions of the IoT focus on machine-type communication (MTC) devices.

OFDM: orthogonal frequency division multiplexing. An air interface that may be defined according to a two-dimensional grid of resource elements, defined by separation of resources in frequency by defining a set of closely spaced orthogonal frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

DFT-s-OFDM: discrete Fourier transform-spread-OFDM. A single carrier frequency modulation based block transmission scheme having a lower PAPR than OFDM.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

RSMA: resource spread multiple access. A non-orthogonal multiple access scheme generally characterized by small, grantless data bursts in the uplink where signaling over head is a key issue, e.g., for IoT.

FDSS: frequency domain spectral shaping. A pulse-shaping filtering process implemented in the frequency domain by element wise multiplication of the filter coefficients and the spectrum of a transmitted signal.

The aspects disclosed herein are generally directed towards generating a reference signal for pi/2-binary phase shift keying (BPSK) modulation. To this end, it should be noted that pi/2-BPSK modulation with frequency domain spectral shaping (FDSS) generally exhibits an unacceptably low peak-to-average power ratio (PAPR). Therefore, it would be desirable to design a reference signal for pi/2-BPSK modulation with FDSS in which the PAPR is acceptable, wherein it is noted that various sequences to base such reference signal would result in an unacceptably high PAPR (e.g., reference signals based on an LTE Chu-sequence or QPSK sequence have too large of a PAPR). For instance, as disclosed herein, aspects for generating such a reference signal include selecting a pi/2-BPSK sequence from a plurality of candidate sequences, and generating a reference signal based on the selected pi/2-BPSK sequence such that the reference signal is associated with a transmission of data modulated according to a pi/2-BPSK modulation.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) NR specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards. And in some cases, a mobile apparatus may also be referred as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE can be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. A a scheduling entity (e.g., a base station 108) can allocate resources for communication among some or all devices and equipment within its service area or cell. Within the present disclosure and in some scenarios, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., a 5G Core Network designed to support throughput, latency, and mobility requirements of different service categories with the introduction of a Services Based Architecture (SBA) and Control and User Plane Separation (CUPS)). In other examples, the core network 102 may be configured according to a 4G evolved packet core (EPC), or any other suitable standard or configuration.

Figure 2:
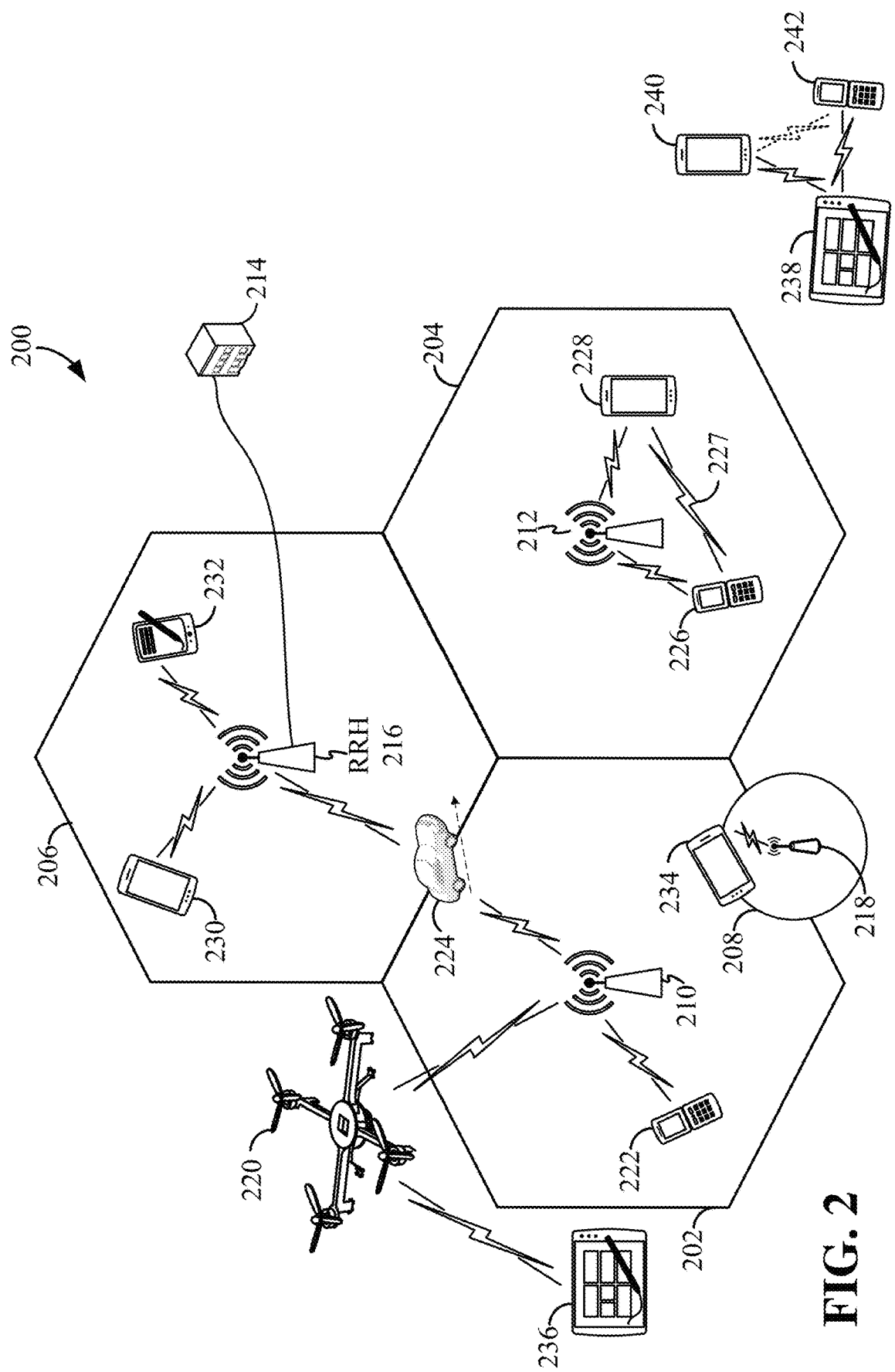
FIG. 2 is a conceptual illustration of an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The radio access network 200 may include any number of wireless base stations, nodes, and cells. As one example, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220. Though not shown, the drone 220 may also be other types of vehicles, including but not limited to, high altitude crafts, aerial-based vehicles, land-based vehicles, or water-going vehicles.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). Mobility features may also include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame generally refers to a logical segment of transmission of a particular time interval. As one example configuration, a frame can refer to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
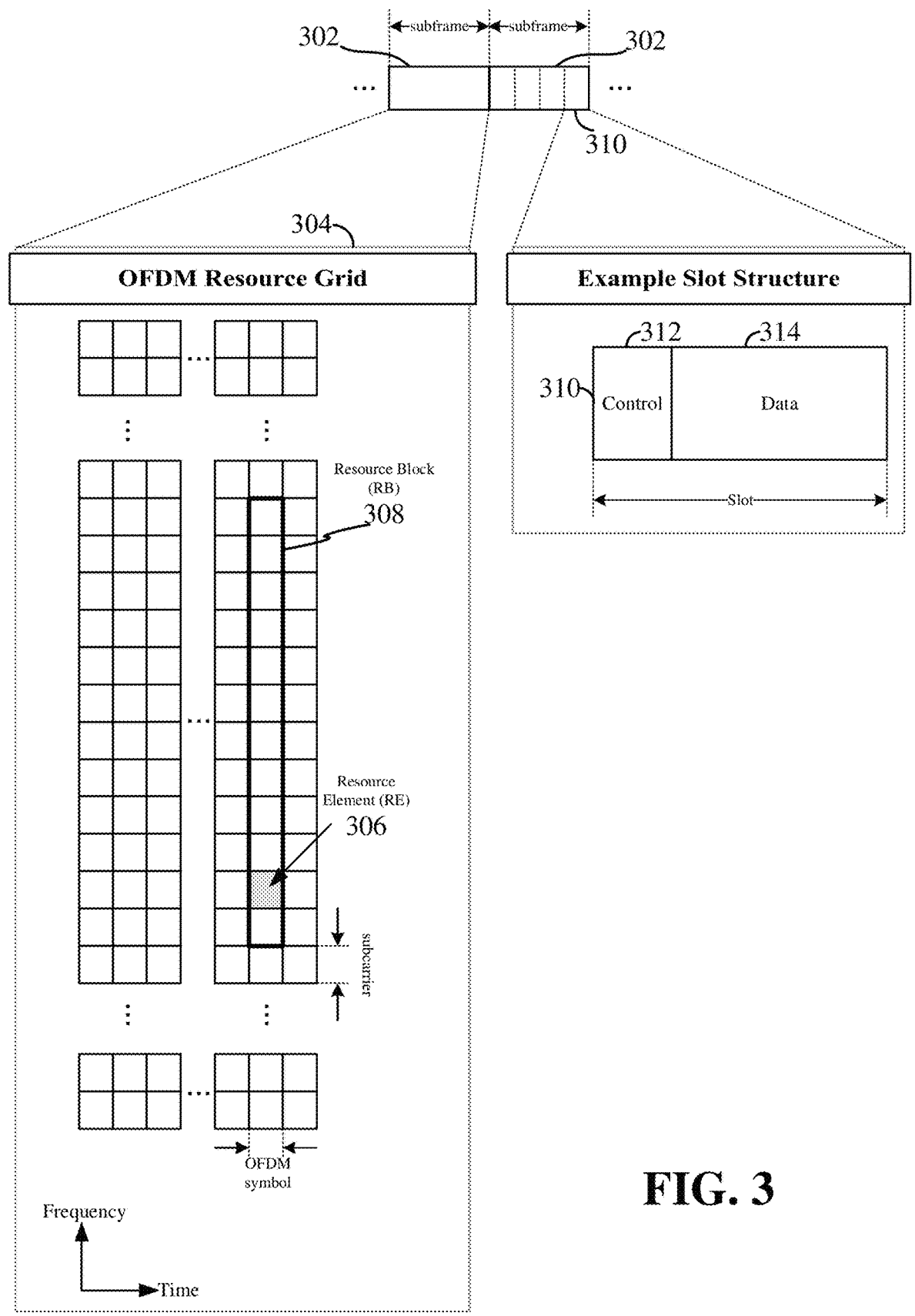
FIG. 3 is a schematic illustration of an organization of wireless resources in an air interface utilizing orthogonal frequency divisional multiplexing (OFDM) according to some embodiments.

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. This data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

EXEMPLARY IMPLEMENTATIONS

Figure 4:
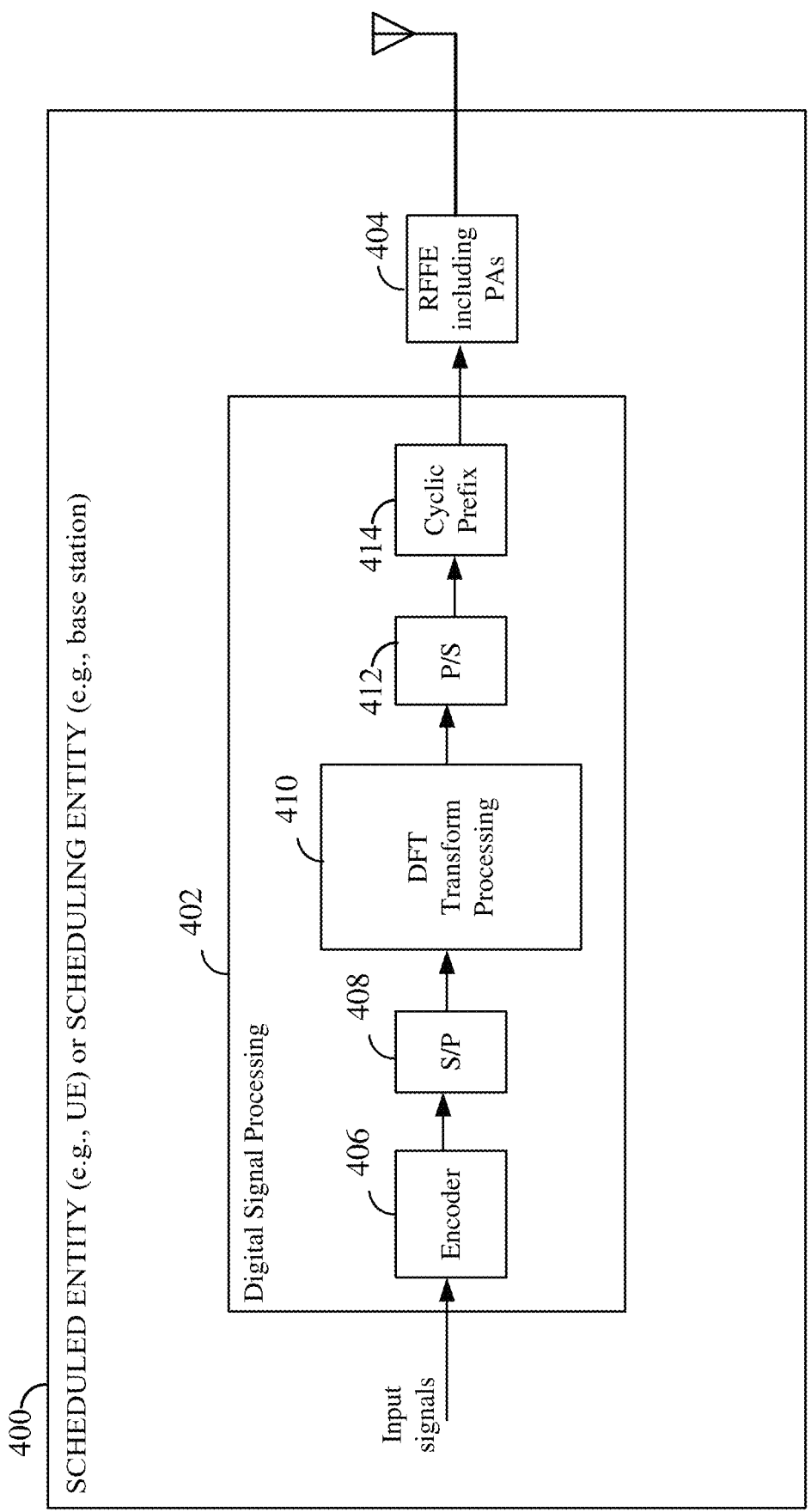
FIG. 4 is a block diagram illustrating a wireless communication system supporting OFDM or discrete Fourier Transform-spreading-OFDM (DFT-s-OFDM) communications.

FIG. 4 illustrates a block diagram illustrating an exemplary wireless communication system 400 supporting OFDM or DFT-s-OFDM communication in which the present methods and apparatus may be employed. System 400 may be a UE in some examples, and configured for both transmitting uplink (UL) transmissions and receiving downlink (DL) transmissions. In particular, FIG. 4 illustrates various components used by the system 400 for transmission of signals, including a digital signal processing portion 402 that receives data signal information and other information (e.g., pi/2-BPSK sequences) from other processing circuitry (not shown) and processes the signals into baseband signals that are, in turn, transmitted at radio frequency (RF) via a radio frequency front-end (RFFE) portion 404 including power amplifiers (PA) and coupled to an antenna for wireless transmission.

The digital signal processing portion 402 may include: an encoder 406 for encoding the received input signal information; a serial to parallel block converter 408 for taking the serial stream of input data and establishing a number of parallel information samples; and a discrete Fourier transform processing portion 410 that receives the number of parallel information samples of the signals from their original domain (e.g., time or space domain) and converts the signals to a representation in the frequency domain for mapping to the various OFDM or DFT-s-OFDM frequencies or tones, and then conversion back into the time domain and conversion back to serialized data with parallel to serial converter 412 for transmission via RF modulation techniques, which also includes digital to analog conversion. The processing portion 402 may also include a cyclic prefix (CP) insertion block 414 for adding a CP between transmitted symbols.

According to other examples, the processing portion 402 may also include low PAPR modulation either prior to or after the DFT processing of block 410 (not illustrated in FIG. 4), such as filtered pi/2-BPSK modulation, which may include the use of a finite impulse response (FIR) or other smoothing filter with the modulation. Filtering applied before the DFT processing would be in the time domain (convolution) and filtering applied after the DFT processing would be in the frequency domain (multiplication). The addition of such modulation affords a reduction in PAPR in order to improve power amplifier (PA) efficiency. This is accomplished by causing the PA to operate in the non-linear region close to saturation point. This requires the transmitted waveform to have a very small PAPR (ideally at 0 dB).

It is noted here that it is known that different modulation techniques can result in different PAPRs for the same data. Various known modulation techniques used in wireless telecommunications include amplitude-shift keying (ASK), frequency shift keying (FSK), phase shift keying (PSK), and quadrature amplitude modulation (QAM), as examples. Concerning PSK, a form of PSK known as binary PSK (BPSK) uses two phases that are separated by 180° in phase to respectively represent a binary "0" or "1" for the modulated signal. While BPSK typically maps the two constellation points on the real axis of the real/imaginary plane (i.e., at 0° and 180°), it does not matter exactly where constellation points are positioned in the complex plane, and the rotation of these points for other variants of BPSK are possible, and such variants may be beneficial for modulation of signals in terms of PAPR, especially when combined with filtering. In one example, pi/2-BPSK modulation rotates the constellation points by pi/2 (90°) on the complex plane in alternating symbols. This modulation has been shown to reduce the PAPR compared to other modulation schemes such as standard BPSK on the real axis or QAM. This PAPR advantage is further augmented when pi/2-BPSK modulation is used with filtering.

Figure 5:
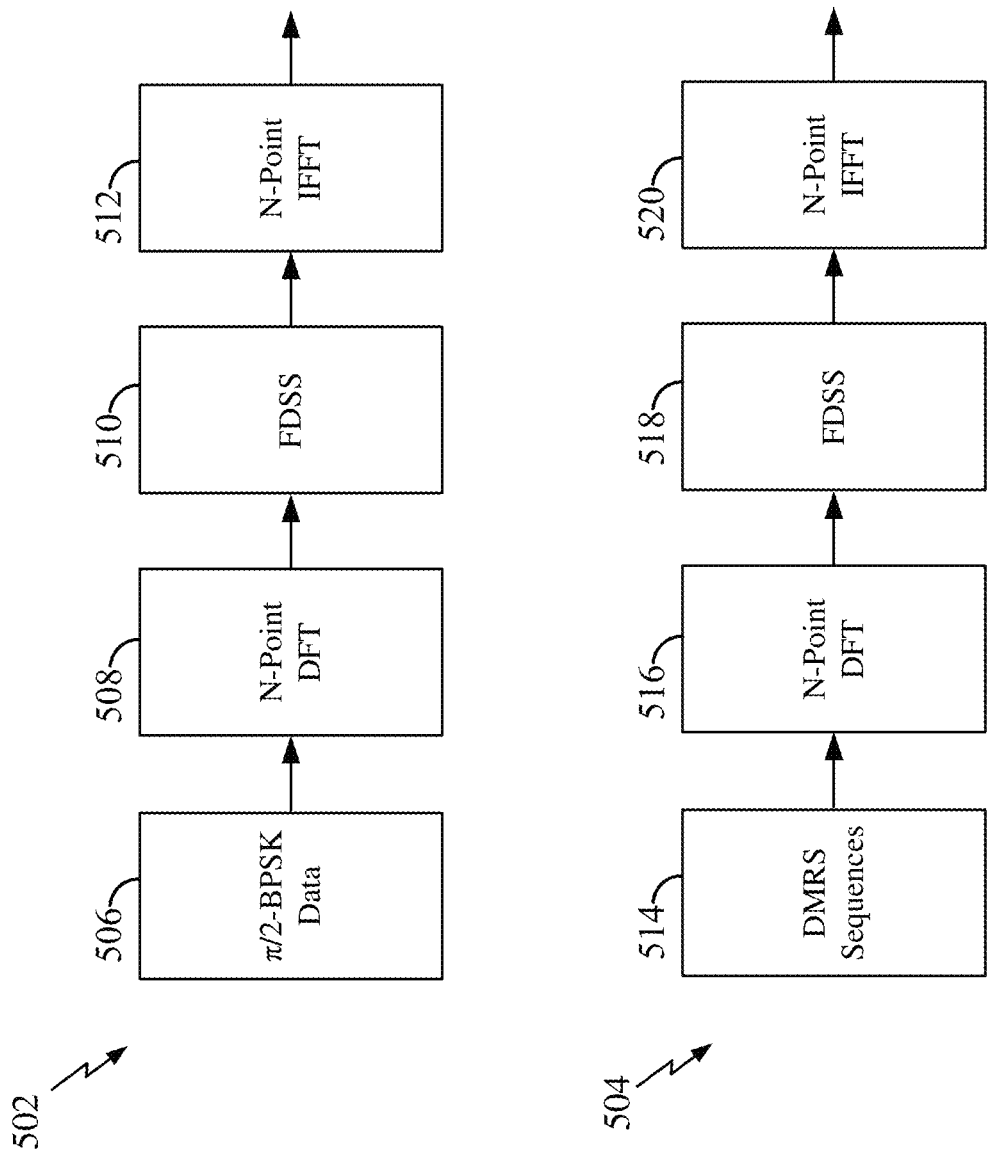
FIG. 5 illustrates two block diagrams of processing apparatus where Frequency-Domain Spectral Shaping (FDSS) filtering is applied to data and reference signaling.

FIG. 5 illustrates two block diagrams of processing apparatus 502 and 504 where FDSS filtering is applied to both data, such as pi/2-BPSK modulated data, and reference signals, such as DMRS signaling. As shown, apparatus 502 receives input data 506 (e.g., pi/2-BPSK modulated data), which is then discrete Fourier transformed (DFT) to N points in the frequency domain as shown by block 508. The output of DFT 508 is then filtered using Frequency-Domain Spectral Shaping (FDSS), in this example, as shown with FDSS block 510. The samples are then inverse discrete Fourier transformed to the time domain as shown by block 512.

Similarly, apparatus 504 receives input reference signaling 514 (e.g., DMRS sequences), which is then discrete Fourier transformed (DFT) to N points in the frequency domain, as shown by block 516. The output of DFT 516 is then filtered using Frequency-Domain Spectral Shaping (FDSS), in this example, as shown by FDSS block 518. The samples are then inverse discrete Fourier transformed to the time domain as shown by block 520.

Figure 6:
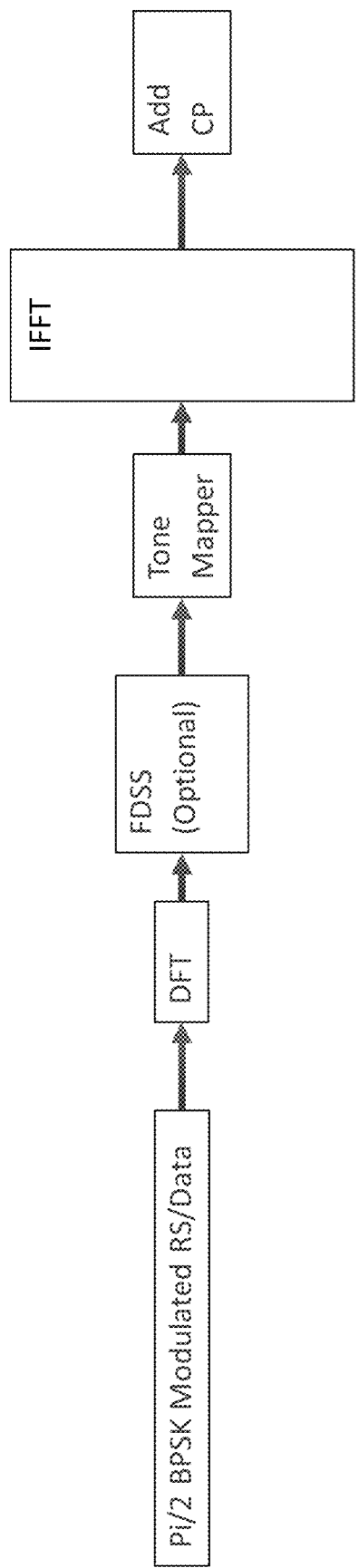
FIG. 6 is a first block diagram illustrating exemplary components for generating a reference signal in accordance with aspects disclosed herein.
Figure 7:
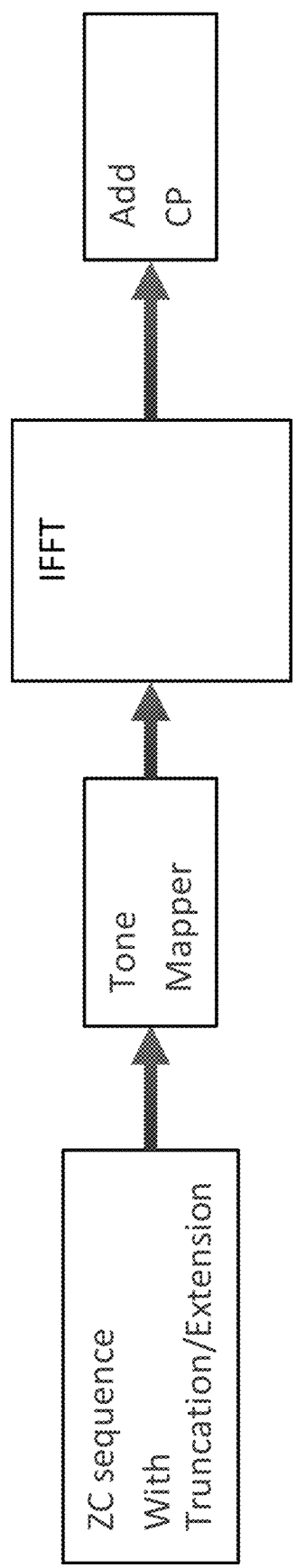
FIG. 7 is a second block diagram illustrating exemplary components for generating a reference signal in accordance with aspects disclosed herein.

As previously mentioned, aspects disclosed herein are generally directed towards generating a reference signal for pi/2-BPSK modulation. Referring next to FIG. 6, a first block diagram illustrating exemplary components for generating a reference signal in accordance with aspects disclosed herein. As illustrated, it is contemplated that a pi/2-BPSK sequence may be used to facilitate the transmission of both data and a corresponding reference signal. To this end, it should be appreciated that the architecture illustrated in FIG. 6 may be used for cases in which a small resource block (RB) is used (e.g., RB<X), as well as a large RB (e.g., RB>X). For instance, where a small RB is used, it is contemplated that computer generated sequences may be used for a pi/2-BPSK modulated reference signal, whereas for a large RB, it is contemplated that gold sequences with a truncation/extension may be used. Alternatively, for a large RB, it is contemplated that a ZC sequence with a truncation/extension may be used (as with LTE) by utilizing the architecture illustrated in FIG. 7.

With respect to small RBs, it is contemplated that a particular search criteria for selecting a desirable pi/2-BPSK sequence from which to base a corresponding reference signal may be used. For instance, such search criteria may include at least one of an autocorrelation associated with each of the plurality of candidate sequences, a fluctuation in frequency domain after a discrete fourier transform (DFT)-spread associated with each of the plurality of candidate sequences, a cross-correlation across the plurality of candidate sequences, or a peak-to-average power ratio (PAPR) associated with each of the plurality of candidate sequences.

Figure 8:
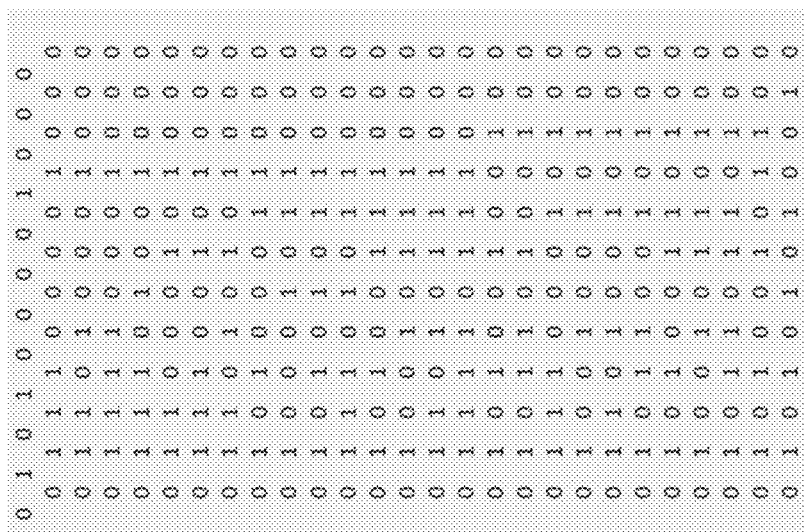
FIG. 8 illustrates a first set of exemplary binary sequences in accordance with an aspect of the disclosure.
Figure 8:
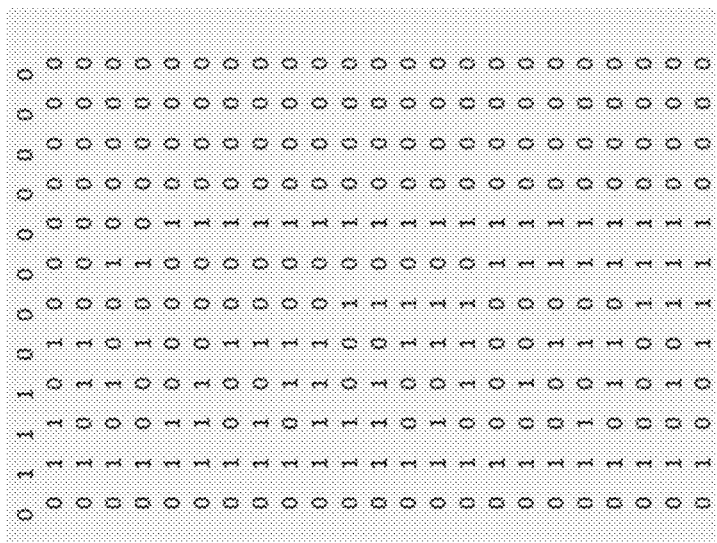
Figure 9:
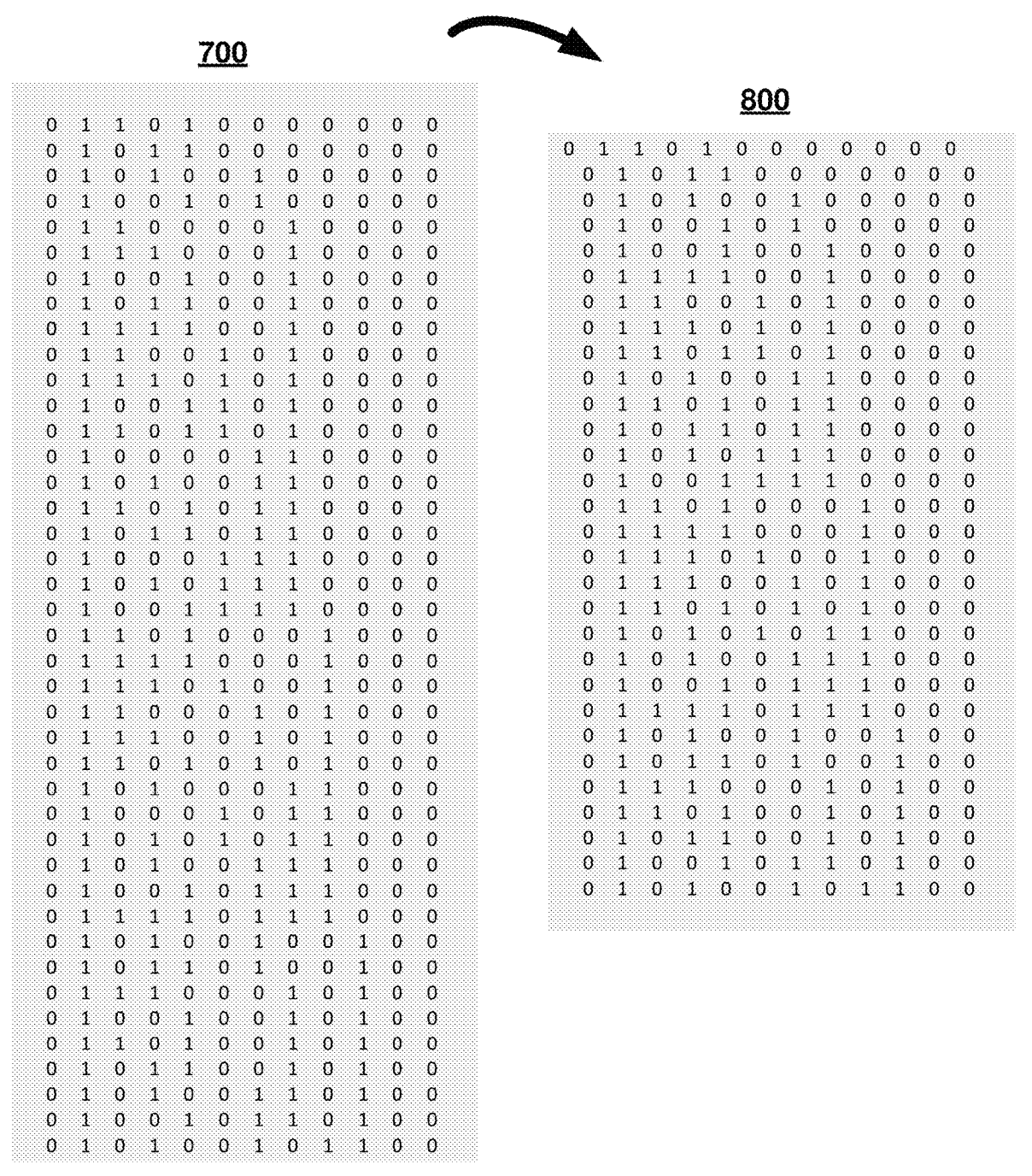

Referring next to FIGS. 8-9, an implementation of such search is illustrated with reference to a first, second, and third set of exemplary binary sequences in accordance with an aspect of the disclosure. In FIG. 8, for instance, a first set of candidate binary sequences 600 are illustrated, wherein 51 sequences are illustrated (assumes 1 RB allocation). Here, it is assumed that such sequences are transformed from a binary sequence to pi/2-BPSK modulated sequences according to:

$$x(n) = \frac{e^{jn\pi/2}}{\sqrt{2}}[(1-2b(n)) + j(1-2b(n))]$$

(NOTE: Sequences that only differ by constant phase rotation or time-domain cyclic shift are considered identical sequences, since they result in large cross-correlation.)

Here, it is assumed that the cyclic-autocorrelation of the sequences 600 in FIG. 8 are perfect according to:

$$\Sigma_{0 \leq n \leq 11} x(n) \text{conj}(x(n+d)) = 0 \text{ for all } d = -11, \ldots, -1, 1, 2, \ldots, 11$$

where indices are interpreted as mod 12.

Referring next to FIG. 9, sequences 700 and 800 are shown, wherein sequences 700 and 800 further narrow sequence 600 based on the aforementioned criteria. Namely, it should be appreciated that sequence 700 now includes 41 sequences with desirably small autocorrelation and desirably small frequency domain fluctuation (i.e., obtained by removing sequences with large frequency domain fluctuation). Meanwhile, sequence 800 then further narrows sequence 700, wherein sequence 800 now includes 30 sequences with desirably small autocorrelation, desirably small frequency domain fluctuation, desirably small cross-correlation, and desirably small PAPR. (i.e., obtained by removing sequences with large frequency domain fluctuation, large cross-correlation, and large PAPR).

Figure 10:
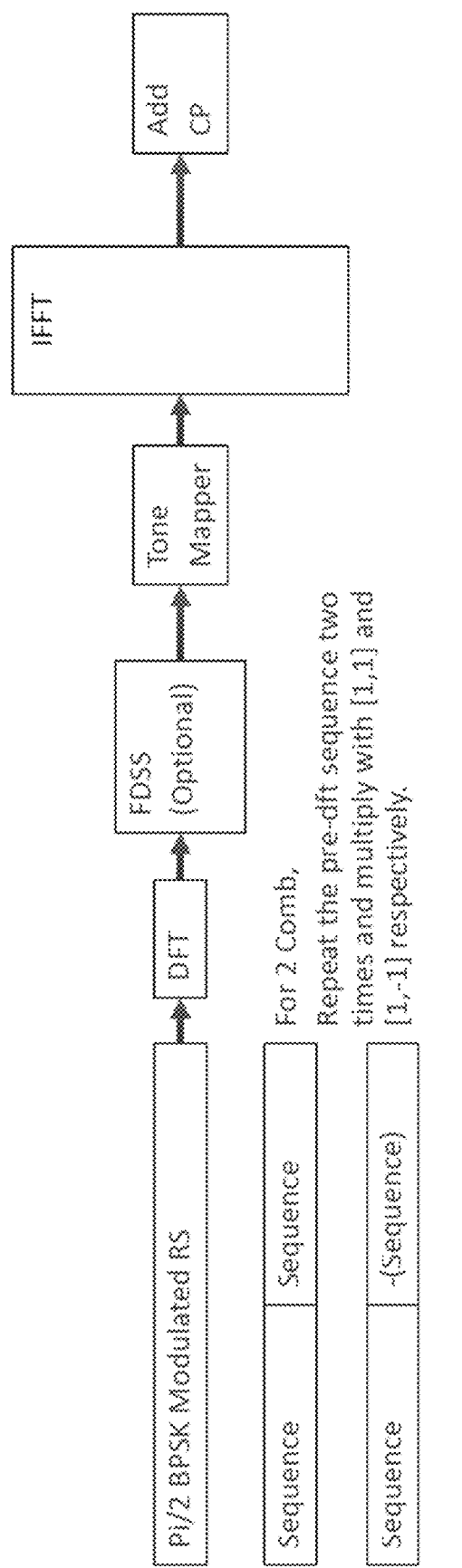
FIG. 10 is a block diagram illustrating exemplary components for generating a reference signal according to a desired comb configuration.

Referring next to FIG. 10, a block diagram illustrating exemplary components for generating a reference signal according to a desired comb configuration is provided in accordance with an aspect of the disclosure.

Figure 11:
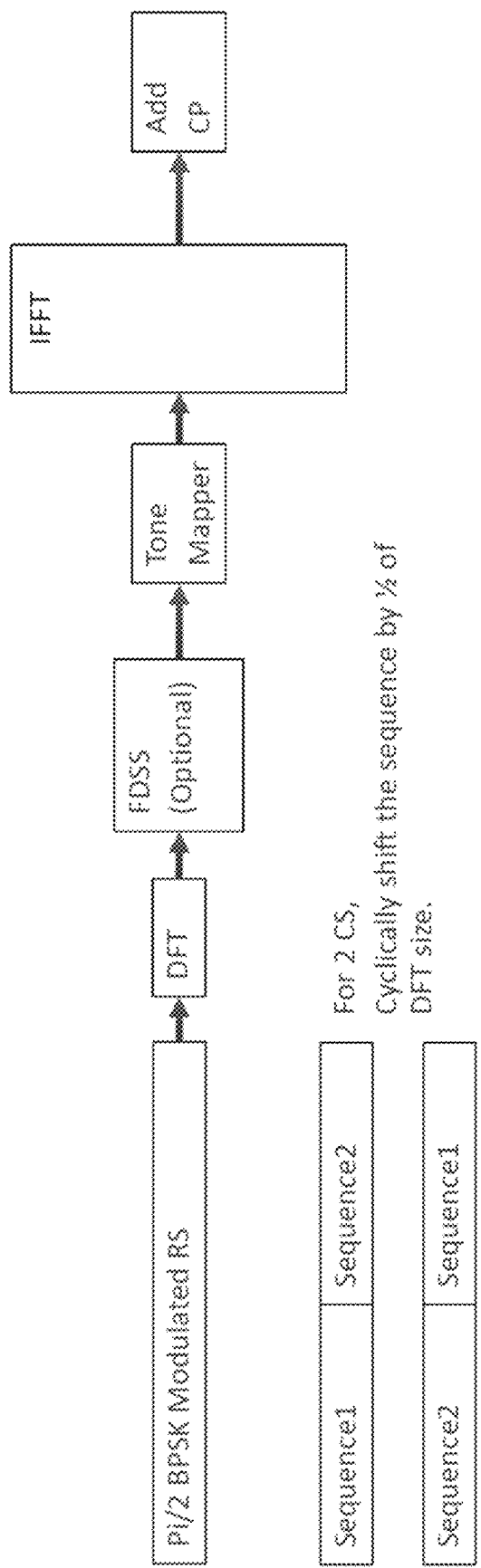
FIG. 11 is a block diagram illustrating exemplary components for generating a reference signal according to a desired cyclic prefix configuration.
Figure 12:
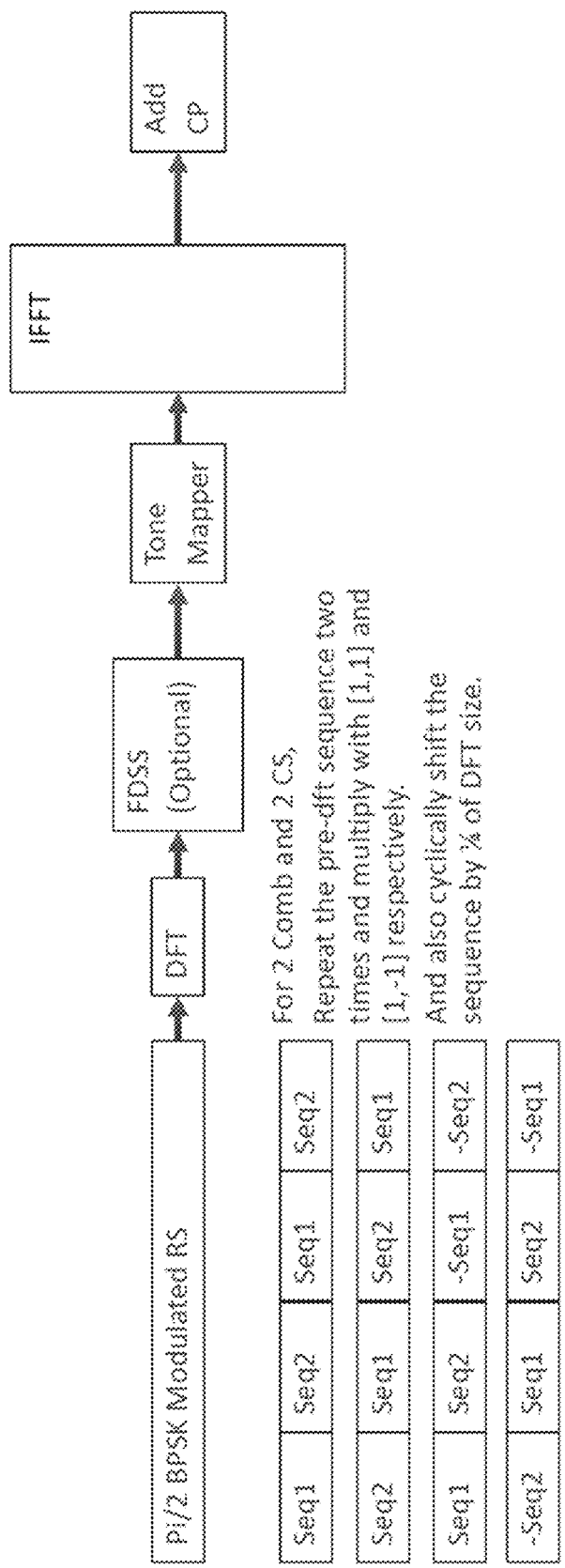
FIG. 12 is a block diagram illustrating exemplary components for generating a reference signal according to a desired comb and cyclic prefix configuration.

Similarly, in FIG. 11 a block diagram illustrating exemplary components for generating a reference signal according to a desired cyclic prefix configuration is provided, whereas FIG. 12 is a block diagram illustrating exemplary components for generating a reference signal according to a desired comb and cyclic prefix configuration.

Figure 13:
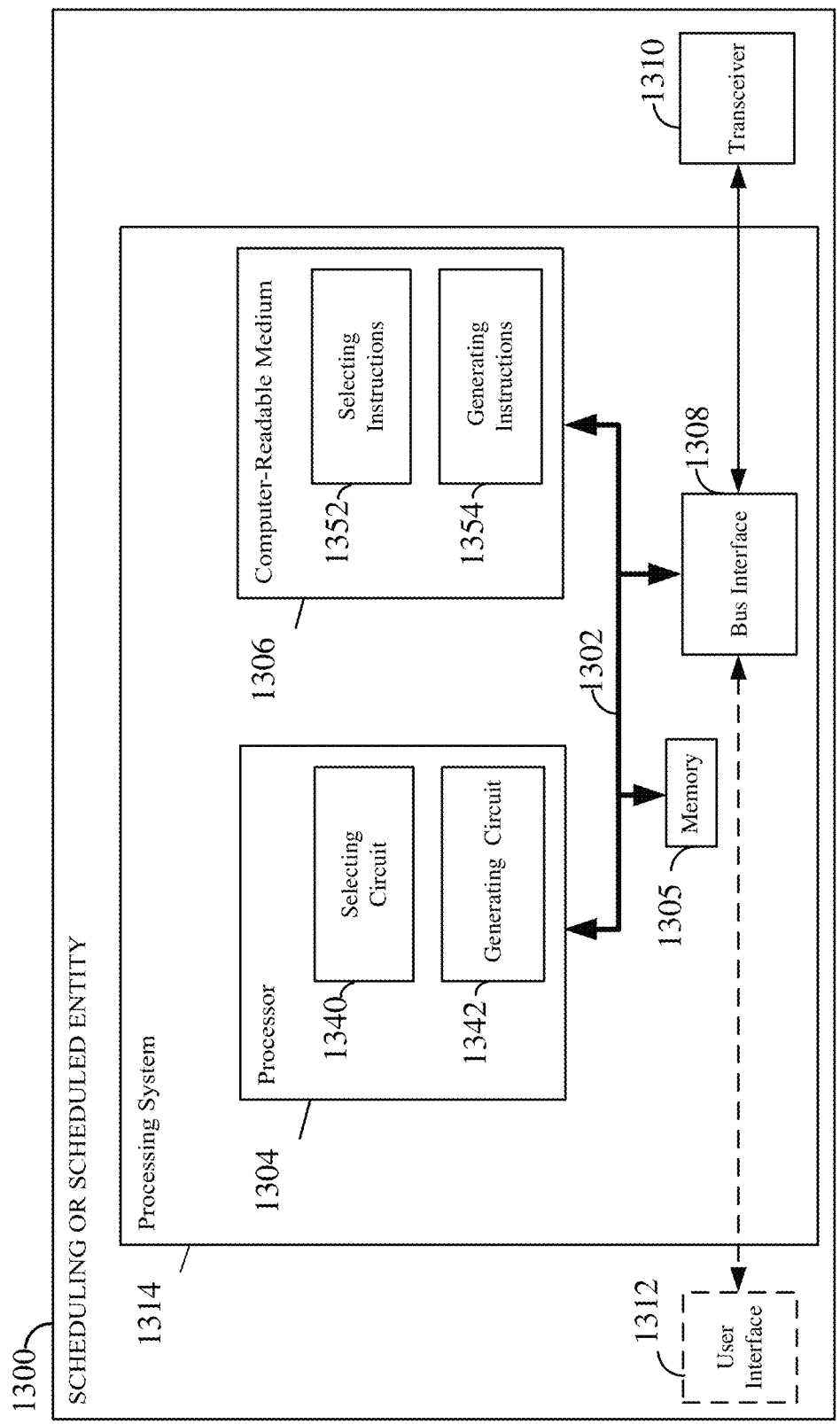
FIG. 13 is a block diagram conceptually illustrating an example of a hardware implementation for a scheduling or scheduled entity according to some aspects of the disclosure.

FIG. 13 is a block diagram illustrating an example of a hardware implementation for a scheduling or scheduled entity 1300 employing a processing system 1314. For example, the scheduling or scheduled entity 1300 may be either a base station or a user equipment (UE) as illustrated in any one or more of FIGS. 1, 2, and/or 4.

The entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below and illustrated in FIG. 15.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include selecting circuitry 1340 configured for various functions, including, for example, selecting a pi/2-BPSK sequence from a plurality of candidate sequences. In some aspects of the disclosure, the processor 1304 may also include generating circuitry 1342 configured for various functions, including, for example, generating a reference signal based on the selected pi/2-BPSK sequence such that the reference signal is associated with a transmission of data modulated according to a pi/2-BPSK modulation.

Various other aspects for entity 1300 are also contemplated. For instance, the selecting circuitry 1340 may be configured to select the pi/2-BPSK sequence from a subset of the plurality of candidate sequences conforming with at least one criteria (e.g., an autocorrelation associated with each of the plurality of candidate sequences, a fluctuation in a frequency domain after a discrete Fourier transform (DFT)-spread associated with each of the plurality of candidate sequences, a cross-correlation across the plurality of candidate sequences, or a peak-to-average power ratio (PAPR) associated with each of the plurality of candidate sequences). Similarly, the selecting circuitry 1340 may also be configured to select the pi/2-BPSK sequence from a subset of the plurality of candidate sequences conforming with the at least one criteria and at least one additional criteria.

In a further aspect of the disclosure, it is contemplated that the selecting circuitry 1340 may be configured to select the pi/2-BPSK sequence according to a resource block size associated with the transmission, wherein the selecting comprises comparing the resource block size with a threshold. For instance, the selecting circuitry 1340 may be configured to select the pi/2-BPSK sequence from a set of computer generated sequences when the resource block size is below the threshold. The selecting circuitry 1340 may also be configured to select the pi/2-BPSK sequence from a set of Gold sequences or a set of Zadoff-Chu (ZC) sequences when the resource block size is above the threshold.

Referring back to the remaining components of entity 1300, the processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may include selecting instructions or software 1352 configured for various functions, including, for example, selecting a pi/2-BPSK sequence from a plurality of candidate sequences. In some aspects of the disclosure, the computer-readable storage medium 1306 may include generating instructions or software 1354 configured for various functions, including, for example, generating a reference signal based on the selected pi/2-BPSK sequence such that the reference signal is associated with a transmission of data modulated according to a pi/2-BPSK modulation.

Figure 14:
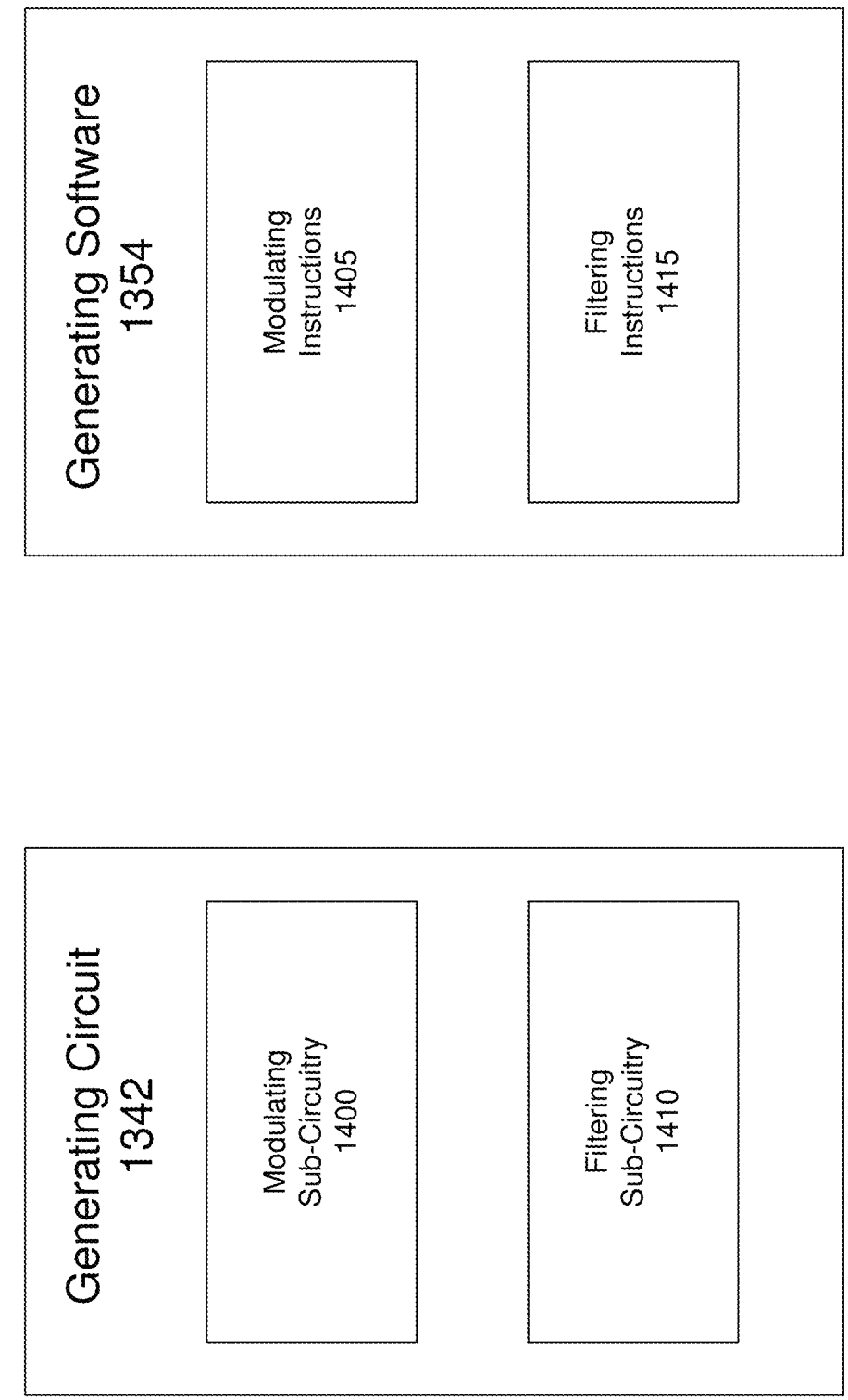
FIG. 14 is a block diagram illustrating exemplary sub-components corresponding to the hardware implementation illustrated in FIG. 13.

Referring next to FIG. 14, exemplary sub-components of generating circuitry 1342 and enabling software 1354 are provided, which facilitate determining such conditions. As illustrated, generating circuitry 1342 may comprise modulating sub-circuitry 900 and filtering sub-circuitry 910; whereas enabling software 1354 may comprise modulating instructions 905 and filtering instructions 915. Here, it is contemplated that modulating sub-circuitry 900 and/or modulating instructions 905 may be configured to modulate a transmission according to the pi/2-BPSK modulation, and wherein the pi/2-BPSK modulation comprises rotating constellation points by pi/2 on a complex plane in alternating symbols. In another aspect, the modulating sub-circuitry 900 and/or modulating instructions 905 may be configured to repeat the selected pi/2-BPSK sequence based on a number of combs, and multiply the repeated pi/2-BPSK sequence with an orthogonal cover code (OCC) which corresponds to a comb. In yet another aspect, the modulating sub-circuitry 900 and/or modulating instructions 905 may be configured to cyclically shift the selected pi/2-BPSK sequence.

In a further aspect, it is contemplated that filtering sub-circuitry 910 and/or filtering instructions 915 may be configured to filter at least one of the reference signal or the data. For instance, filtering sub-circuitry 910 and/or filtering instructions 915 may be configured to utilize at least one of a Frequency-Domain Spectral Shaping (FDSS) filter or a finite impulse response (FIR). It should also be appreciated that filtering sub-circuitry 910 and/or filtering instructions 915 may be configured to perform a filtering before or after a discrete Fourier transform (DFT). For instance, it is contemplated that filtering sub-circuitry 910 and/or filtering instructions 915 may be configured to filter the at least one of the reference signal or the data in a time domain prior to a DFT. Similarly, it is also contemplated that filtering sub-circuitry 910 and/or filtering instructions 915 may be configured to filter the at least one of the reference signal or the data in a frequency domain after a DFT.

Figure 15:
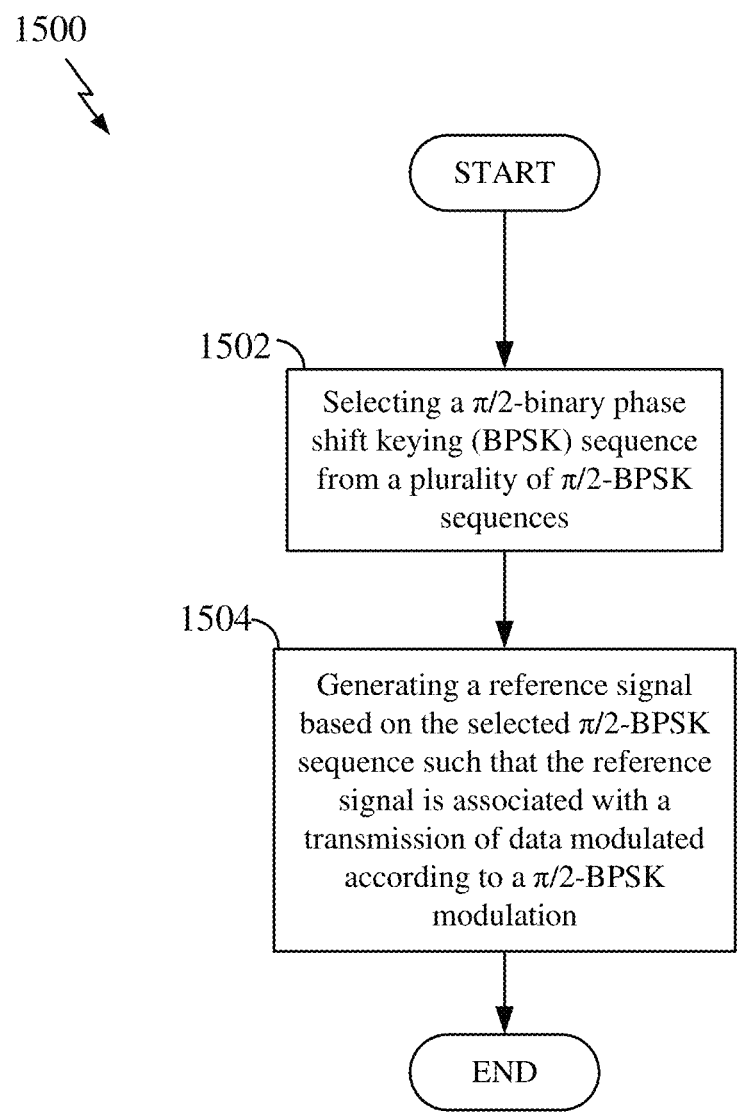
FIG. 15 is a flow chart illustrating an exemplary process for generating reference signals according to some aspects of the disclosure.

FIG. 15 is a flow chart illustrating an exemplary process 1500 for generating a reference signal in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the entity 1300 illustrated in FIG. 13. In some examples, the process 1500 may be carried out by any suitable apparatus or means for carrying out the functions or algorithm described below.

Method 1500 features a method for generating a reference signal including selecting a pi/2-BPSK sequence from a plurality of candidate sequences 1502. As illustrated, method 1500 may further include generating a reference signal based on the selected pi/2-BPSK sequence such that the reference signal is associated with a transmission of data modulated according to a pi/2-BPSK modulation 1504.

In one configuration, the apparatus 1300 for wireless communication includes means for selecting a pi/2-BPSK sequence from a plurality of candidate sequences and means for generating a reference signal based on the selected pi/2-BPSK sequence such that the reference signal is associated with a transmission of data modulated according to a pi/2-BPSK modulation. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGs., and utilizing, for example, the processes and/or algorithms described herein in relation to FIG. 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   selecting a pi/2-binary phase shift keying (BPSK) sequence from a plurality of candidate sequences, according to a resource block size associated with a transmission of data and a comparison between the resource block size and a threshold;
   generating a reference signal based on the selected pi/2-BPSK sequence, wherein the reference signal is associated with the transmission of data modulated according to a pi/2-BPSK modulation; and
   transmitting the reference signal.

2. The method of claim 1, wherein the selecting comprises selecting the pi/2-BPSK sequence from a subset of the plurality of candidate sequences conforming with at least one criteria.

3. The method of claim 2, wherein the selecting comprises selecting the pi/2-BPSK sequence from a subset of the plurality of candidate sequences conforming with the at least one criteria and at least one additional criteria.

4. The method of claim 2, wherein the at least one criteria is at least one of an autocorrelation associated with each of the plurality of candidate sequences, a fluctuation in a frequency domain after a discrete Fourier transform (DFT)-spread associated with each of the plurality of candidate sequences, a cross-correlation across the plurality of candidate sequences, or a peak-to-average power ratio (PAPR) associated with each of the plurality of candidate sequences.

5. The method of claim 1, wherein the selecting comprises selecting the pi/2-BPSK sequence from a set of computer generated sequences when the resource block size is below the threshold.

6. The method of claim 1, wherein the selecting comprises selecting the pi/2-BPSK sequence from a set of pi/2-BPSK modulated Gold sequences when the resource block size is above the threshold.

7. The method of claim 1, wherein the generating comprises filtering at least one of the reference signal or the data.

8. The method of claim 7, wherein the filtering comprises utilizing at least one of a Frequency-Domain Spectral Shaping (FDSS) filter or a finite impulse response (FIR).

9. The method of claim 7, wherein the filtering is performed in a time domain prior to a discrete Fourier transform (DFT).

10. The method of claim 7, wherein the filtering is performed in a frequency domain after a discrete Fourier transform (DFT).

11. The method of claim 1, wherein the pi/2-BPSK modulation comprises rotating constellation points by pi/2 on a complex plane in alternating symbols.

12. The method of claim 1, wherein the generating further comprises repeating the selected pi/2-BPSK sequence based on a number of combs, and multiplying the repeated pi/2-BPSK sequence with an orthogonal cover code (OCC) which corresponds to a comb.

13. The method of claim 1, wherein the generating further comprises cyclically shifting the selected pi/2-BPSK sequence.

14. An apparatus for wireless communication, comprising:
   a communication interface;
   a memory; and
   a processor coupled to the memory,
   wherein the processor and the memory are configured to:
      select a pi/2-binary phase shift keying (BPSK) sequence from a plurality of candidate sequences, according to a resource block size associated with a transmission of data and a comparison between the resource block size and a threshold;
      generate a reference signal based on the selected pi/2-BPSK sequence, wherein the reference signal is associated with the transmission of data modulated according to a pi/2-BPSK modulation; and
      transmit the reference signal via the communication interface.

15. The apparatus of claim 14, wherein the processor and the memory are further configured to select the pi/2-BPSK sequence from a subset of the plurality of candidate sequences conforming with at least one criteria.

16. The apparatus of claim 15, wherein the processor and the memory are further configured to select the pi/2-BPSK sequence from a subset of the plurality of candidate sequences conforming with the at least one criteria and at least one additional criteria.

17. The apparatus of claim 15, wherein the at least one criteria is at least one of an autocorrelation associated with each of the plurality of candidate sequences, a fluctuation in a frequency domain after a discrete Fourier transform (DFT)-spread associated with each of the plurality of candidate sequences, a cross-correlation across the plurality of candidate sequences, or a peak-to-average power ratio (PAPR) associated with each of the plurality of candidate sequences.

18. The apparatus of claim 14, wherein the processor and the memory are further configured to select the pi/2-BPSK sequence from a set of computer generated sequences when the resource block size is below the threshold.

19. The apparatus of claim 14, wherein the processor and the memory are further configured to select the pi/2-BPSK sequence from a set of pi/2-BPSK modulated Gold sequences when the resource block size is above the threshold.

20. The apparatus of claim 14, wherein the processor and the memory are further configured to filter at least one of the reference signal or the data.

21. The apparatus of claim 20, wherein the processor and the memory are further configured to utilize at least one of a Frequency-Domain Spectral Shaping (FDSS) filter or a finite impulse response (FIR).

22. The apparatus of claim 20, wherein the processor and the memory are further configured to filter the at least one of the reference signal or the data in a time domain prior to a discrete Fourier transform (DFT).

23. The apparatus of claim 20, wherein the processor and the memory are further configured to filter the at least one of the reference signal or the data in a frequency domain after a discrete Fourier transform (DFT).

24. The apparatus of claim 14, wherein the processor and the memory are further configured to modulate the transmission according to the pi/2-BPSK modulation, and wherein the pi/2-BPSK modulation comprises rotating constellation points by pi/2 on a complex plane in alternating symbols.

25. The apparatus of claim 14, wherein the processor and the memory are further configured to repeat the selected pi/2-BPSK sequence based on a number of combs, and multiply the repeated pi/2-BPSK sequence with an orthogonal cover code (OCC) which corresponds to a comb.

26. The apparatus of claim 14, wherein the processor and the memory are further configured to cyclically shift the selected pi/2-BPSK sequence.

27. An apparatus for wireless communication, comprising:
    means for selecting a pi/2-binary phase shift keying (BPSK) sequence from a plurality of candidate sequences, according to a resource block size associated with a transmission of data and a comparison between the resource block size and a threshold;
    means for generating a reference signal based on the selected pi/2-BPSK sequence, wherein the reference signal is associated with the transmission of data modulated according to a pi/2-BPSK modulation; and
    means for transmitting the reference signal.

28. A non-transitory computer-readable medium storing computer-executable code, comprising code for causing a computer to:
    select a pi/2-binary phase shift keying (BPSK) sequence from a plurality of candidate sequences, according to a resource block size associated with a transmission of data and a comparison between the resource block size and a threshold;
    generate a reference signal based on the selected pi/2-BPSK sequence, wherein the reference signal is associated with the transmission of data modulated according to a pi/2-BPSK modulation; and
    transmit the reference signal.

\* \* \* \* \*